US008562878B1

(12) United States Patent
Martin et al.

(10) Patent No.: US 8,562,878 B1
(45) Date of Patent: Oct. 22, 2013

(54) STRESS-TUNED CONDUCTOR-POLYMER COMPOSITE FOR USE IN SENSORS

(75) Inventors: James E. Martin, Tijeras, NM (US); Douglas H. Read, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1808 days.

(21) Appl. No.: 11/681,221

(22) Filed: Mar. 2, 2007

(51) Int. Cl.
*C04B 35/00* (2006.01)

(52) U.S. Cl.
USPC .......................................................... 264/104

(58) Field of Classification Search
USPC ............................ 264/104; 428/213; 252/512
See application file for complete search history.

(56) References Cited

U.S. PATENT DOCUMENTS 4,631,952 A 12/1986 Donaghey
5,512,882 A 4/1996 Stetter et al.
5,851,644 A * 12/1998 McArdle et al. .............. 428/213
6,194,769 B1 2/2001 Martin et al.
6,290,868 B1 9/2001 Martin et al.
6,537,498 B1 3/2003 Lewis et al.
6,844,378 B1 * 1/2005 Martin et al. ................. 523/300
7,112,304 B2 9/2006 Starling et al.
7,138,090 B2 11/2006 Blok

OTHER PUBLICATIONS

Read et al., Strain-Tunable Chemiresistor, Anal. Chem 2010, 82, 2150-2154.*

* cited by examiner

*Primary Examiner* — Larry Thrower
(74) *Attorney, Agent, or Firm* — Carol I. Ashby

(57) ABSTRACT

A method for making a composite polymeric material with electrical conductivity determined by stress-tuning of the conductor-polymer composite, and sensors made with the stress-tuned conductor-polymer composite made by this method. Stress tuning is achieved by mixing a miscible liquid into the polymer precursor solution or by absorbing into the precursor solution a soluble compound from vapor in contact with the polymer precursor solution. The conductor may or may not be ordered by application of a magnetic field. The composite is formed by polymerization with the stress-tuning agent in the polymer matrix. The stress-tuning agent is removed following polymerization to produce a conductor-polymer composite with a stress field that depends on the amount of stress-tuning agent employed.

11 Claims, 3 Drawing Sheets

STRESS-TUNED CONDUCTOR-POLYMER COMPOSITE FOR USE IN SENSORS

The United States Government has rights in this invention pursuant to Department of Energy Contract No. DE-AC04-94AL85000 with Sandia Corporation.

BACKGROUND OF THE INVENTION

This invention relates to a composite polymeric material with electrical conductivity determined by stress-tuning of the conductor-polymer composite. The material finds utility as a sensor for environmental factors that alter the strain state of the polymeric composite.

Martin et al. (U.S. Pat. No. 6,194,769), which is incorporated herein by reference, reports a class of sensor devices comprising field-structured conducting composites comprising a textured distribution of conducting magnetic particles. The conducting properties of such field-structured materials can be precisely controlled during fabrication so as to exhibit a large change in electrical conductivity when subject to any environmental influence which deforms or swells the composite. Influences which can be so detected include shear and tensile strains, temperature change, humidity, magnetic field, electromagnetic radiation, and the presence or absence of certain chemicals.

Martin et al. (U.S. Pat. No. 6,290,868), which is incorporated herein by reference, reports a class of composite materials, called field-structured composite (FSC) materials, which comprise an oriented aggregate structure made of magnetic particles suspended in a nonmagnetic medium, and to a new class of processes for their manufacture.

Martin et al. (U.S. Pat. No. 6,844,378), which is incorporated herein by reference, reports a method of producing three-dimensional particle structures with enhanced magnetic susceptibility in three dimensions by applying a triaxial energetic field to a magnetic particle suspension and subsequently stabilizing the particle structure. Combinations of direct current and alternating current fields in three dimensions produce particle gel structures, honeycomb structures, and foam-like structures.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

Figure 1:
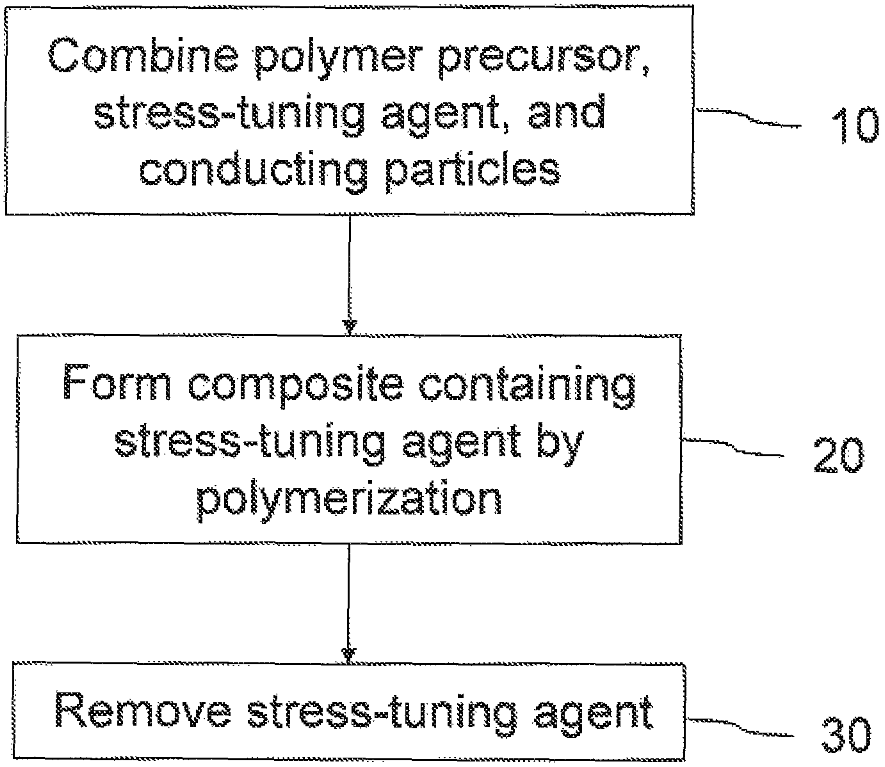
FIG. 1 illustrates an embodiment of the method of this invention.

This invention comprises a conductor-polymer composite with electrical conductivity determined by stress-tuning of the conductor-polymer composite. Stress control is achieved by mixing a miscible liquid into the polymer precursor solution or by absorbing into the precursor solution a soluble compound from vapor in contact with the polymer precursor solution. The material that is added to the polymer precursor solution is the stress-tuning agent. FIG. 1 illustrates an embodiment of this invention. The polymer precursor solution, the stress-tuning agent, and conductor particles are combined 10 to form the polymerizable suspension. The polymerizable suspension is then partially or completely polymerized 20 with all or some of the stress-tuning agent still present in the polymer. The goal is to cure the polymer in a swollen state due to the presence of the miscible liquid or soluble compound. After the polymer is partially or fully polymerized, the stress-tuning agent is substantially removed 30 from the polymer by evaporation. The evaporation can be facilitated by heating in some embodiments. The result is a compressive stress field within the polymer that is greater than that which would be present from the shrinkage during the normal curing of the polymer in the absence of the stress-tuning agent. This compressive stress field can shift the response of a sensor made with the stressed polymer to higher concentrations of a particular analyte; this shift is proportional to the volume fraction of the stress-tuning agent. The effect of such isotropic pre-stress on the response curve of a sensor is to shift the response range of such sensors to imposed tensile, compressive, or shear strains. The effect of the pre-stress is to reduce the sensitivity of such sensors to environmental parameters that alter the stress in the polymer.

Conductor-polymer composites are made by dispersing electrically conducting particles within a polymer precursor solution and then polymerizing the suspension. Such composites can exhibit large changes in electrical conduction when subjected to mechanical strains due to changes in the electrical contact pressure between the conducting particles within the composite. The electrical conductance of a particle contact is generally due to Ohmic contact and electron tunneling. The conductance of an Ohmic contact depends on the contact pressure, and the conductance of electron tunneling depends on the contact gap. In either case, a change in the stress in the composite changes the interparticle contact and alters the resistance of the composite when a suitable concentration and distribution of conductive particles are present. Change in the stress in the composite changes this conductive contact and alters the resistance of the composite when a suitable concentration and distribution of conductive particles is present. Sensitivity to changes in stress is obtained when conductive contacts between adjacent particles establish conductive paths between electrodes in contact with the composite. Particle volume fractions in composites made by the method of this invention are chosen to lie in the range where changes in stress can produce detectable changes in the resistivity of the composite. Too few particles with too great an interparticle separation distance produce a nonconductive state. Particle volume fractions in composites made by the method of this invention are chosen to lie in the range where changes in stress can produce detectable changes in the resistivity of the composite. Conducting particle volume fractions in the range of 0.1% to 50% are useful. Embodiments of this invention alter the built-in stress of the conductor-polymer composite and thereby shift the range of strain needed to cause a measurable change in the resistivity of the composite. In embodiments of this invention, the built-in stress is controlled by the volume fraction of the stress-tuning agent during polymerization and the resulting composite is termed a stress-tuned conductor-polymer composite. The polymer formed in the presence of the stress-tuning agent is termed a stress-tuned polymer.

Figure 2:
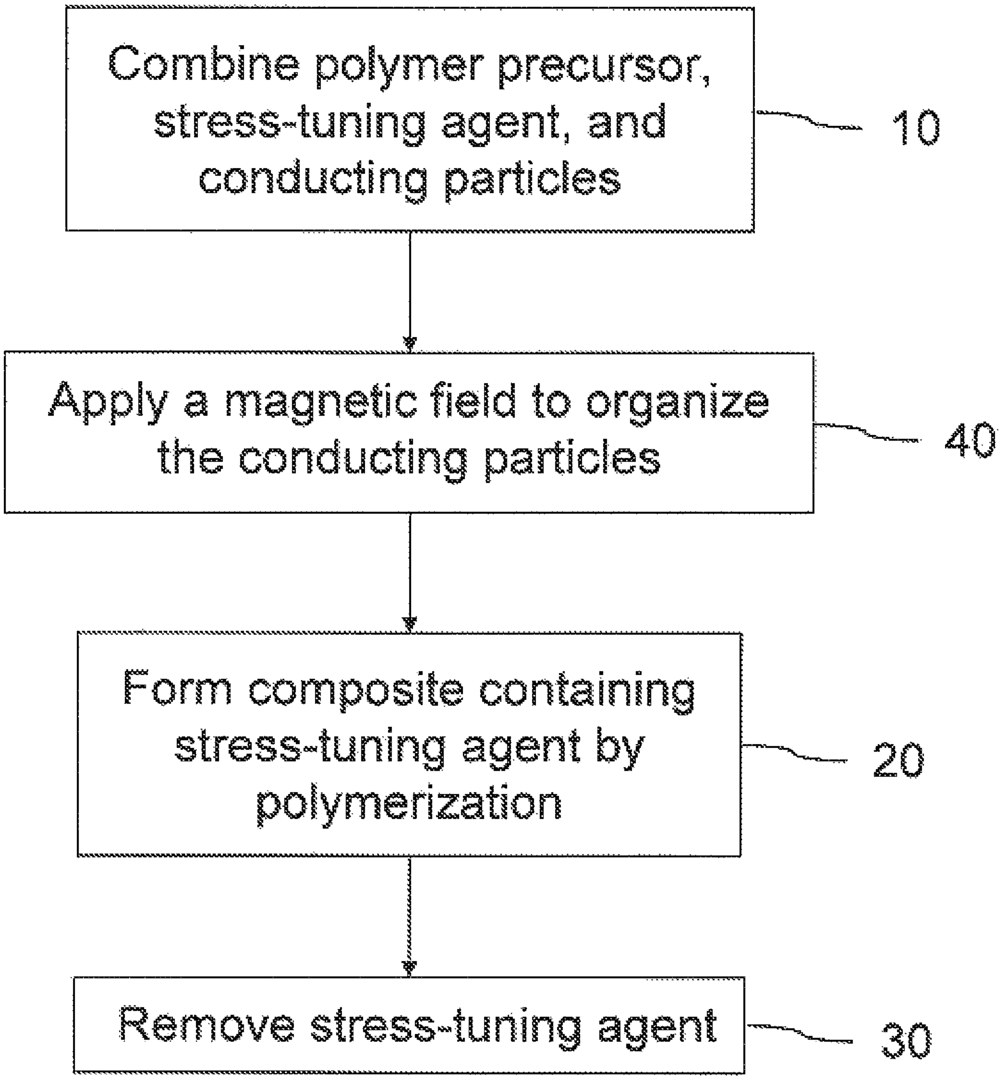
FIG. 2 illustrates an embodiment of the method of this invention wherein magnetic fields are employed to organize the conducting particles before polymerization.

In some embodiments of this invention (illustrated in FIG. 2), the conducting particles are magnetic particles that can be ordered within the polymer precursor solution by the application of a magnetic field 40 to provide a more uniform and more controlled distribution of conducting particles within the conductor-polymer composite after polymerization. These field-structured composites and the method for making them are described in detail in Martin et al., U.S. Pat. No. 6,290,868 and Martin et al., U.S. Pat. No. 6,844,378, which are incorporated herein by reference.

Conductor-polymer composites can exhibit large changes in electrical conduction when subjected to mechanical strains. These strains can be caused by pressure, compression, tension, shear, thermal expansion, or the absorption of a chemical, such as, for example, a volatile organic compound or other types of compounds. The following discussion is presented in terms of tuning the response of a conductor-polymer composite to the presence of a chemical analyte, but the use of embodiments of this invention in applications for measuring other environmental parameters that can change the mechanical strain or stress is also intended. For a particular concentration and distribution of conducting particles within a non-conducting material (insulator), such as a polymer, the conductor-insulator composite changes from a conductor to an insulator over a relatively narrow range of analyte concentration. Such composites act essentially as a chemical switch. The concentration of analyte over which the conductor-insulator transition occurs can be varied over a wide range by controlling the structure and stress of the composite. An array of sensors, such as chemiresistors, made with such composites with a range of stress-tuned sensitivities can be used to accurately determine the concentration of an analyte over a concentration range of about three decades.

Embodiments of this invention involving field-structured composites produce materials with especially well-controlled sensing properties because of the sparse, controllable, and reproducible connectivity of the conducting particle agglomerates. In contrast, composites made without field-structuring consist of essentially randomly dispersed conducting particles whose particle agglomerates are formed randomly. The conductivity of these unstructured composites can be highly dependent on the particle volume fraction. Beneath a volume fraction called the percolation threshold, the conductivity is quite small because the particles do not form conducting pathways that bridge between the electrodes. Significantly above the percolation threshold, the particles form conducting pathways between the electrodes; but these pathways are so numerous that there is not a pronounced sensitivity of the composite conductivity to applied strains, such as occur when the composite is swollen by an analyte. Unstructured composites with volume fractions slightly above the percolation threshold have far fewer conducting pathways spanning between the electrodes and thus have a conductivity that is small but sensitive to applied strains. However, the conductivity of such composites can be highly dependent on both the manner in which the particles are mixed into the prepolymer resin and on particle sedimentation. As a result, the conductivity of unstructured composites prepared near the percolation threshold can be difficult to control.

Composites whose particles have been structured into particle agglomerates with magnetic fields are conductive even at low particle volume fractions, exhibit great sensitivity of the conductivity to applied strains, and have conductivities that are highly reproducible. For these reasons field-structured composites display better performance characteristics than unstructured composites for stress tuning of the response curve by preswelling.

For the purpose of this invention, the terms silicone polymer and siloxane polymer include their derivatives comprising functional groups including but not restricted to halides and to alkyl, alkenyl, akynyl, and aryl groups and their derivatives. While the illustrative embodiment below employs a silicone polymer (also known as a siloxane polymer), a wide range of polymers may be used in embodiments of this invention. Some suitable polymers include but are not restricted to poly(dimethylsiloxane), polymethylhydrogensiloxane, alkylmethyl siloxanes, polyphenylmethylsiloxane, polytrifluoropropylmethylsiloxane, poly(isoprene) (natural rubber), poly (butadiene-co-styrene), poly(butadiene-co-isoprene), poly (chloroprene), poly(isobutene-co-isoprene), poly(ethylene), poly(propylene), poly(acrylonitrile), poly(vinyl chloride), poly (vinyl acetate), poly(methyl methacrylate), poly(styrene), and epoxies. For the purpose of this invention, each term is intended to include their derivatives comprising functional groups including but not restricted to halides, alcohols, ethers, esters, acids, aldehydes, ketones, glycols, polynuclear araomatics, phenols, enols, amines, alkanes, alkenes, alkynes, dienes, arenes, phenyls, nitriles, nitro compounds, mercaptans, and to their derivatives.

In some embodiments, films of stress-tuned conductor-polymer composites were fabricated on sensor platforms as follows. Equal amounts (approximately 0.25 g) of silicone polymer and cross-linker were combined to form the polymer precursor solution. Au-coated Ni particles (4-7 micrometer diameter) were dispersed within this solution. A stress-tuning agent, hexadecane in these embodiments, was added to this solution in various amounts (0, 1, 2, and 4 vol. %). A small amount (5 microliter or a 3 mm diameter drop) of composite solution was placed on an insulating substrate with patterned Au electrodes and cured in a magnetic field. Complex magnetic fields were created by a magnet consisting of three orthogonal pairs of Helmholtz coils. The cure time was controlled by the catalyst concentration. Thin sensors having short response times can be produced by addition of a high-volatility miscible liquid to the polymer composite solution prior to deposition onto the substrate. The solvent in some embodiments is hexane and the intended purpose is to thin the composite solution. The miscible liquid is intended to be removed by evaporating before cure. In some embodiments, the solution is applied to the substrate by spin-casting. The polymer cures with some or all of the stress-tuning agent in the polymer. After the polymer is partially or fully cured, the stress-tuning agent is allowed to evaporate. A substantially complete removal by evaporation facilitates reproducible response to stress by the composite. Evaporation can be facilitated by gentle heating. A liquid suitable for use as the stress-tuning agent has a volatility sufficiently low that at least a portion of the liquid will remain in solution with the composite until partial or full curing of the polymer matrix has been achieved and also has a volatility sufficiently high that the stress-tuning agent can be essentially removed by evaporation from the final cured composite. Examples include alkanes alkenes, alkynes, dienes, alicyclic hydrocarbons, arenes, alcohols, ethers, ketones, aldehydes, carbonyls, carbanions, and aromatic compounds. The functionalized derivatives of these classes of compounds are intended to be included in claims citing the compound class name. In some embodiments, heating to approximately 45° C. is employed.

Figure 3:
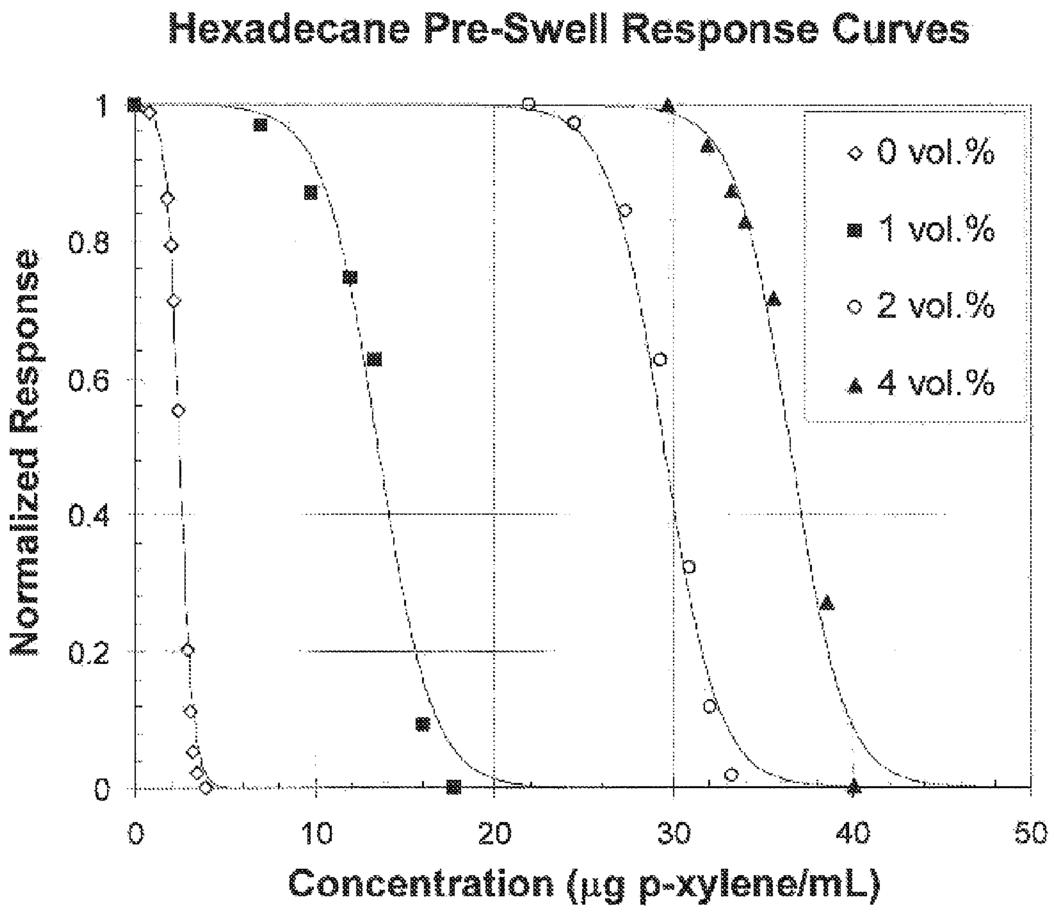
FIG. 3 illustrates the effect of variation in stress in four conductor-polymer composites made with different quantities of stress-tuning agent. The normalized response (y axis) is defined as the electrical current at fixed voltage passing through the sensor in a strained state divided by the current of the sensor in an unstrained state. In this embodiment, the strain is caused by the presence of the analyte in the polymer. The variation in stress due to the effect of the stress-tuning agent is shown by the change in the sensing range of the composite as it serves as the sensing film of a chemiresistor. The higher built-in stress of the film made with the higher concentration of stress-tuning agent shifts the sensing range of the sensor to span higher concentrations of analyte vapors.

Other temperatures may be employed; the selection of the temperature for evaporation will depend on the vapor pressure of the stress-tuning agent as a function of temperature. The resulting conductor-polymer composite has an isotropic compressive stress field that is additional to that which would obtain from the cure shrinkage of the polymer in the absence of the stress-tuning agent. The stress in the composite is greater for composites cured with greater amounts of stress-tuning agent. The presence of the higher compressive stress is manifested in the sensitivity of four chemiresistor devices made using, as sensing films, four different conductor-polymer composites made with different quantities of stress-tuning agent. The chemiresistor films whose responses curves are illustrated in FIG. 3 employed 15 vol. % conducting particles and hexadecane concentrations of 0, 1, 2, or 4 vol. %. The variation in built-in stress is results in the change in the response curves of the composite as it serves as the sensing film of a chemiresistor device. The higher built-in stress of the film made with the higher concentration of stress-tuning agent shifts the concentration response curve of the sensor to higher concentration of analyte vapor. The magnitude of the midpoint response shift is proportional to the volume fraction of stress-tuning agent employed during composite formation. The response mid-point is the analyte concentration corresponding to a normalized response of 0.5 for a particular chemiresistor device. The response range is defined as the range of analyte concentration over which a chemiresistor changes from an electrical conductor to an insulator or the difference between the upper detection limit and the lower detection limit.

The shift of the response curve to higher concentration of analyte depends upon the volume fraction of stress-tuning agent employed during formation of the composite film. The response range (the range of analyte concentration over which a chemiresistor changes from a electrical conductor to insulator or the difference between the upper detection limit and the lower detection limit) of each film is only slightly broadened by the shift in sensing range. Increasing the built-in stress by increasing the hexadecane concentration shifted the sensing range to progressively higher concentrations. In these embodiments, the stress resulting from 4% stress-tuning agent during film curing shifted the response curve mid-point concentration by a factor of 20.

The range of suitable particle concentrations in terms of volume fraction of particles to polymer is defined by the difference between the minimum number of particles needed to obtain electrical conduction through the composite without strain induced by an environmental factor, such as the presence of an analyte, and the maximum number of particles above which the electrical conductivity is independent of applied strain on the composite. A wide range of particle volume fractions are suitable for making stress-tuned chemiresistors. A volume fraction that is sufficient to create current conducting pathways through the composite is useful for embodiments of this invention. The numerical values corresponding to this range depend on the type of particles used and their structural orientation, for example, random distributions, chains, 2-D sheets, 3-D foam, and other structures. The concentration can vary from approximately 0.1 to 50 volume percent particles. For example, in an embodiment with 4 to 7 micrometer Au/Ni particles, a useful particle concentration could be approximately 15 vol. %.

In some embodiments, the particles may have a layered structure (for example, a core-shell structure). For example, in embodiments where a magnetic field is used to organize the particles within the composite, a magnetically susceptible particle core can be coated with a conductive outer shell. For example magnetically susceptible particles comprising ferrites, cobalt, nickel, gadolinium, chromium, iron, manganese, or some other magnetically susceptible material can be coated with a conductive outer shell. Some examples of suitable conducting materials include but are not restricted to carbon, gold, silver, platinum, and copper. In other embodiments, the particle core can be a non-magnetically susceptible material.

In some embodiments for forming a chemiresistor array using sensing films formed by the method of this invention, a plurality of chemiresistors can be made using differing amounts of stress-tuning agent in the film. This can provide sensitivity to the concentration of an analyte over a range of concentrations where the range is determined by the differently stress-tuned composites that are employed as the sensing film.

While the preceding discussion generally dealt with detection of strain induced by a chemical in the composite when comprising part of a chemiresistor, it should be clear to one skilled in the art that the composites made by the method of this invention are also useful for detecting any phenomenon that produces strain in the composite. Two examples among many of phenomena that could induce detectable strain include but are not restricted to mechanical deformation and temperature change.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for making a stress-tuned conductor-polymer composite, the method comprising:

combining a polymer precursor solution having a first volume, an amount of a stress-tuning agent comprising at least one of a liquid miscible in the polymer precursor solution and compound from vapor in contact with the polymer precursor solution that is soluble in the polymer precursor solution, and a plurality of conducting particles to form a polymerizable suspension having a second volume, wherein the second volume is controlled by the amount of the stress-tuning agent;

polymerizing the polymerizable suspension to form a conductor-polymer composite; and substantially removing the stress-tuning agent from the conductor-polymer composite to form a stress-tuned conductor-polymer composite.

2. The method of claim 1, further comprising applying a magnetic field to organize the conducting particles within the polymerizable suspension, wherein the conducting particles are magnetic particles.

3. The method of claim 2, wherein the magnetic particles are selected from the group consisting essentially of ferrite, cobalt, nickel, iron, gadolinium, chromium, and manganese.

4. The method of claim 1, wherein the conducting particles comprise a conductive outer shell on a particle core.

5. The method of claim 1, wherein the conducting particles are selected from the group consisting essentially of gold, silver, platinum, copper, carbon, ferrite, cobalt, nickel, iron, gadolinium, chromium, and manganese.

6. The method of claim 1, wherein the stress-tuned conductor-polymer composite comprises between approximately 1 volume percent and approximately 50 volume percent conducting particles.

7. The method of claim 1, wherein the stress-tuning agent is a liquid that is miscible with the polymer precursor solution and can be removed by evaporation from the conductor-polymer composite.

8. The method of claim 7, wherein the stress-tuning agent is selected from the group consisting of hexadecane, silicone oils, alkanes, alkenes, alkynes, alcohols, aldehydes, ketones, and aromatic compounds.

9. The method of claim 1, further comprising providing a vapor of the stress-tuning agent in contact with the surface of the polymer precursor solution.

10. The method of claim 9, wherein the stress-tuning agent is selected from the group consisting of alkanes, alkenes, alkynes, dienes, alicyclic hydrocarbons, arenes, alcohols, ethers, ketones, aldehydes, carbonyls, carbanions, aromatic compounds, and water.

11. The method of claim 1, wherein the polymer precursor is selected from the group consisting of a silicone polymer precursor, a siloxane polymer precursor, and a precursor for at least one polymer consisting essentially of poly(dimethylsiloxane), polymethylhydrogensiloxane, alkylmethyl siloxanes, polyphenylmethylsiloxane, polytrifluoropropylmethylsiloxane, poly(isoprene), natural rubber, poly(butadiene-co-styrene), poly(butadiene-co-isoprene), poly(chloroprene), poly(isobutene-co-isoprene), poly(ethylene), poly(propylene), poly(acrylonitrile), poly(vinyl chloride), poly (vinyl acetate), poly(methyl methacrylate), and poly(styrene).

* * * * *